United States Patent [19]

Tatsumi et al.

[11] Patent Number: 5,519,288
[45] Date of Patent: May 21, 1996

[54] DRIVE CIRCUIT FOR POWDER TYPE ELECTROLUMINESCENT DEVICE WITH CHARGE AND DISCHARGE CONTROL

[75] Inventors: Naoki Tatsumi; Daigo Morioka, both of Shiga, Japan

[73] Assignee: NEC Corporation, Tokyo, Japan

[21] Appl. No.: 290,462

[22] Filed: Aug. 15, 1994

[30]  Foreign Application Priority Data

Aug. 31, 1993  [JP]  Japan .................................. 5-215512

[51] Int. Cl.$^6$ .................................................. H05B 37/02
[52] U.S. Cl. ...................... 315/169.3; 315/307; 315/225; 345/76; 345/77; 345/212
[58] Field of Search ............................. 315/169.1, 169.3, 315/169.4, 307, 241 S, 241 P, 225, 247; 345/76, 77, 78, 79, 80, 211, 212, 213; 363/124, 89; 327/131, 134, 136, 137, 140

[56]  References Cited

U.S. PATENT DOCUMENTS

| | | | |
|---|---|---|---|
| 4,182,977 | 1/1980 | Stricklin, Jr. | 315/158 |
| 4,443,741 | 4/1984 | Tanaka et al. | 315/307 |
| 4,527,096 | 7/1985 | Kindlmann | 315/169.3 |
| 4,982,314 | 1/1991 | Miki | 363/16 |
| 5,144,203 | 9/1992 | Fujita et al. | 315/169.3 |
| 5,218,272 | 6/1993 | Jones | 315/247 |
| 5,233,339 | 8/1993 | Newman et al. | 345/212 X |

FOREIGN PATENT DOCUMENTS

| | | | |
|---|---|---|---|
| 63-11314 | 3/1987 | Japan . | |
| 2139520 | 5/1990 | Japan | 345/77 |
| 448579 | 2/1992 | Japan . | |

*Primary Examiner*—Robert Pascal
*Assistant Examiner*—Arnold Kinkead

[57]  ABSTRACT

A powder type electroluminescent (EL) device comprises a step-up circuit for charging a capacitive EL element during a charge period, discharge transistor for discharging electric charge from the EL element during a discharge period, a voltage detector for detecting the predetermined voltage of the EL element to generate a charge-up signal, and a control section for starting the discharge period responsive to the charge-up signal. Even if the equivalent capacitance of the EL element decreases or the loss in the EL element increases with an enviromental condition, deterioration in luminous intensity does not arise. Accordingly, a longer life of the EL device can be obtained.

6 Claims, 5 Drawing Sheets

DRIVE CIRCUIT FOR POWDER TYPE ELECTROLUMINESCENT DEVICE WITH CHARGE AND DISCHARGE CONTROL

BACKGROUND OF THE INVENTION (a) Field of the Invention

The present invention relates to a powder type electroluminescent (EL) device and, more specifically, to a powder type EL device having a drive circuit in which charging and discharging of a capacitive EL element is effected by a high DC voltage obtained by step-up of a DC supply voltage.

(b) Description of the Related Art

A powder type EL element, a capacitive load in a sense for a drive circuit, has a structure of a capacitor in which a layer of a luminous body is sandwiched between two electrodes. The luminous body or layer is made of an dielectric material including a fluorescent material dispersed therein. When a surge voltage changing in magnitude thereof with time is applied between the electrodes of the EL element, the EL element is rendered luminous by a surge electric field generated by the surge voltage, energizing the fluorescent material in the luminous layer. The powder type EL element is generally driven by a drive circuit called an inverter.

FIG. 1 shows an equivalent circuit of a conventional powder type EL device. The drive circuit of the EL device generally designated at 10 comprises a step-up circuit 12 having oscillator 14 of a relatively short repetitive period and receiving a DC supply voltage from battery 16 to provide a surge-pulse train to an EL element 18, discharge section 20 including discharge transistor 22 for discharging electric charge from the EL element 18 to the earth potential, and a control section 24 including a second oscillator for controlling the step-up circuit 12 and discharge transistor 22 periodically. The step-up circuit 12 generates a periodical surge-pulse train including a series of surge pulses having a uniform energy among the individual pulses of the pulse train. The control section 24 controls the step-up circuit 12 and discharge transistor 22 to operate alternately, thereby effecting charging and discharging of the powder type EL element 18 alternately.

During a charge period of the EL element 18, the EL element is gradually charged up by a series of surge pulses. After the charge period continued in a certain amount of time to inject electric charge to the EL element 18, a discharge period starts so that electric charge accumulated by he pulse train on the EL element is discharged to the ground during the discharge period through discharge transistor 22.

The amount of the electric charge injected by one surge pulse depends on the magnitude of the voltage of the EL element appearing between the electrodes thereof. That is, the lower the voltage of the EL element is, the larger the amount of electric charge is injected by a surge pulse. An equivalent resistance for electric energy lost or consumed for the electroluminescence in the EL element can be regarded as a resistor connected between he electrodes in parallel to the capacitive EL element, so that the energy loss or consumption in the EL element increases in proportion to the square of the voltage appearing between the electrodes of the EL element. The voltage of the EL element during the charge period increases along a logarithmic saturation curve, resulting in that the voltage increment per unit time decreases with time to substantially zero eventually.

Assuming that the equivalent resistance for the energy loss of the EL element is constant, the larger the equivalent capacitance of an EL element is or the smaller the energy of the surge pulses is, the longer is required for a time period for voltage rise during which the voltage of the EL element rises from the ground level up to its saturation level.

In case where the charge period determined by the frequency of the second oscillator in the control section is set longer than the time period for voltage rise of the EL element, a saturation period during which the voltage of EL element remains in the saturation level continues for a long time. During such a saturation period, the EL element is scarcely luminous since the EL device can be luminous substantially only when he voltage of the EL element rises or falls rapidly. Hence, in this case, the luminous intensity of the EL element is very low because of the short luminescent period per one operation cycle including a charging and a discharging periods.

Moreover, since the EL element has a tendency that the equivalent capacity thereof reduces with age, the saturation period, which does not function for luminescence, per one operation cycle becomes large with age, resulting in a deterioration in he luminous function of the EL element additionally to the low luminous intensity as described above. Such a deterioration reduces the life of an EL device.

On the other hand, in case where the charge period determined by the frequency of the second oscillator is set smaller than the time period for voltage rise of the EL element, the charge period comes to an end before the voltage of the EL element rises to a value sufficient for luminescence, resulting in an insufficient luminescence in the EL element because of the low voltage of the EL element.

Another problem in the conventional drive circuit as described above is that, since the charge period is constant while the energy of a surge pulse depends on a supply voltage, the voltage of the EL element increases with the increase of a voltage supplied by a battery, resulting in a possibility of an ultimate break down in the EL element.

FIG. 2 shows another type of a conventional drive circuit for a powder type EL element. The drive circuit generally designated at 30 comprises a step-up circuit 12 such as shown in FIG. 1, a switching circuit 32 having two serially connected pairs of transistor 34, 38 and diode 36, 40, a control section 42 for controlling the step-up circuit 12 and the switching circuit 32, a serial resonance circuit including a reactance of reactor 42 and a capacitance of the powder type EL element 18 to be driven and having one of the terminals connected between the pairs of transistor 34, 38 and diode 36, 40, and a pair of serial capacitors 44 and 46 for maintaining the other of the terminals of the serial resonance circuit at an intermediate potential of the output of the step-up circuit 12.

In operation, the high DC voltage generated by the step-up circuit 12 is fed to one of the electrodes of the EL element 18 periodically through the switching circuit 30 and the reactor 42. Then, the energy of the resonance circuit is discharged to the earth potential complementarily with the charging. The frequency obtained by the operation of the switching circuit 30 is relatively low, i.e. in a range between 500 and 1000 Hz.

In the second conventional drive circuit 30 for an EL element 18, since the operating frequency of the switching circuit 30 is low, the reactor 42 provided for serial resonance circuit should have a large reactance for obtaining serial resonance, so that the size of the reactor 42 becomes large resulting in a large area for the drive circuit.

SUMMARY OF THE INVENTION

In view of the foregoing, an object of the present invention is to provide an EL device comprising a drive circuit which is capable of reduction in size and avoidance of deterioration in luminous intensity with age due to a reduction of capacitance in the EL element and having a low possibility of a breakdown in the EL element due to a voltage rise of a supply voltage.

According to the present invention, there is provided a powder type EL device comprising: a capacitive electroluminescent element, a step-up circuit for providing a surge-pulse train to the electroluminescent element during a charge period to thereby charge the electroluminescent element, a voltage detector for detecting a predetermined voltage of the electroluminescent element to thereby generate a charge-up signal, a discharge section for discharging electric charge from the electroluminescent element during a discharge period occurring alternately with the charge period, a control section for controlling the charge period and the discharge period, said control section starting the discharge period responsive to said charge-up signal.

In accordance with the EL device according to the present invention, charge period per one cycle is not constant but variable, since the charge period can be finished when the voltage of the EL element reaches a predetermined voltage level. Accordingly, even if the equivalent capacitance of the EL element decreases or the loss in the EL element increases with age, deterioration in luminous intensity or insufficient luminous intensity does not arise, whereby a longer life of the EL device can be obtained.

Moreover, in the EL device according to the present invention, overvoltage of the EL element does not arise even when the supply voltage rises or the characteristics of the EL element changes, so that breakdown of the EL element due to a high voltage of a battery can be avoided. Further, the EL device according to the present invention does not comprise a reactor so that it can be of a small size.

BRIEF DESCRIPTION OF THE DRAWINGS

The above and other objects, features and advantages of the present invention will be more apparent from the following description, taken in conjunction with the accompanying drawings in which.

DESCRIPTION OF THE PREFERRED EMBODIMENTS

Figure 1:
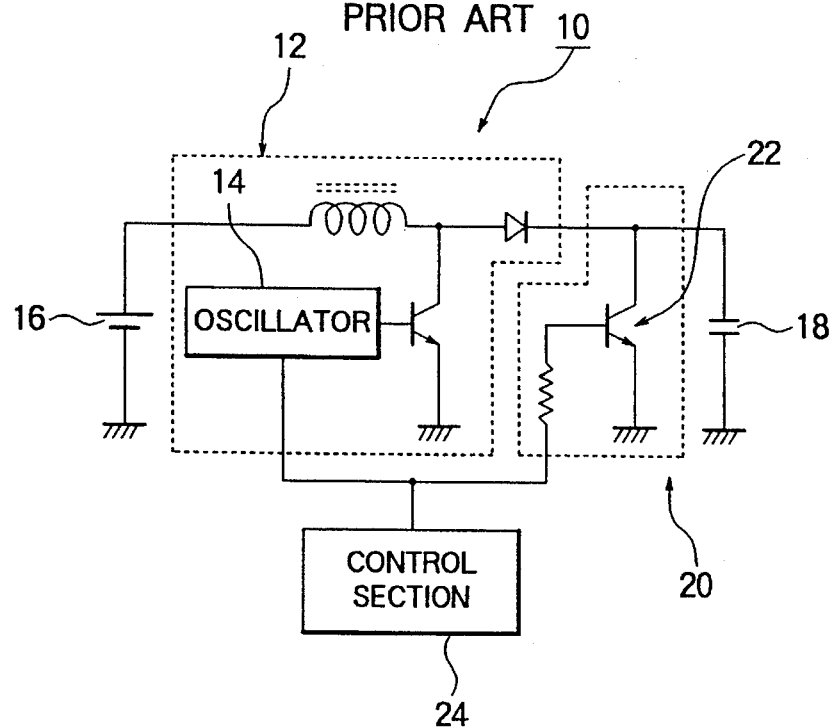
FIG. 1 is a schematic diagram of a conventional powder type EL device.
Figure 2:
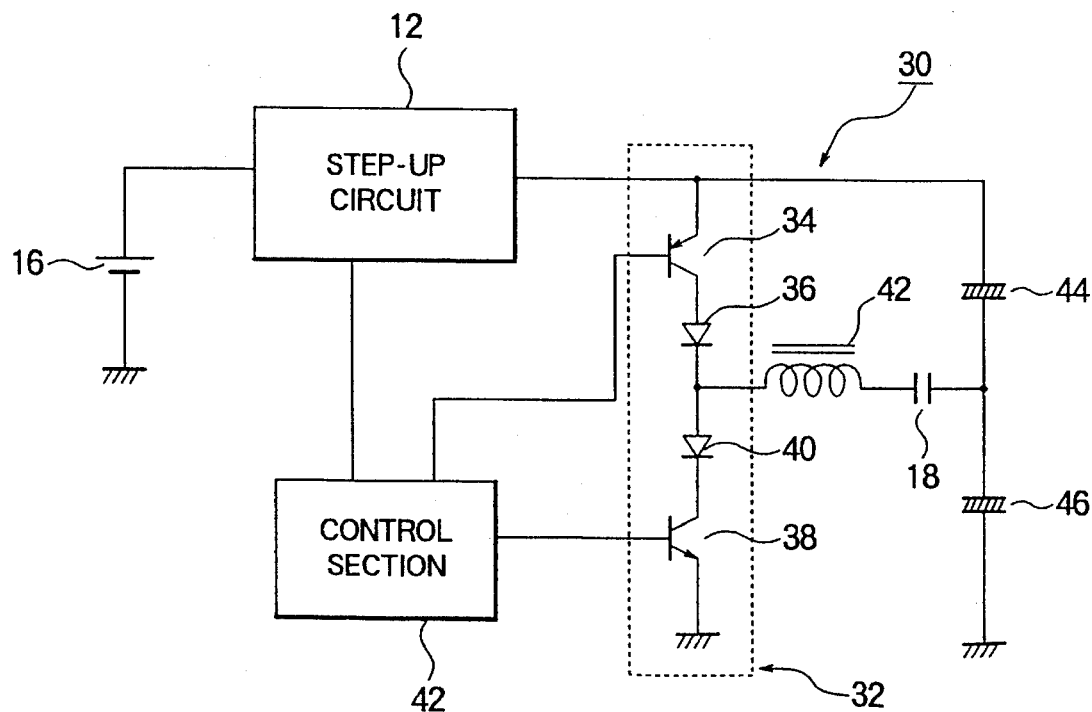
FIG. 2 is a schematic diagram of another conventional powder type EL device.
Figure 3:
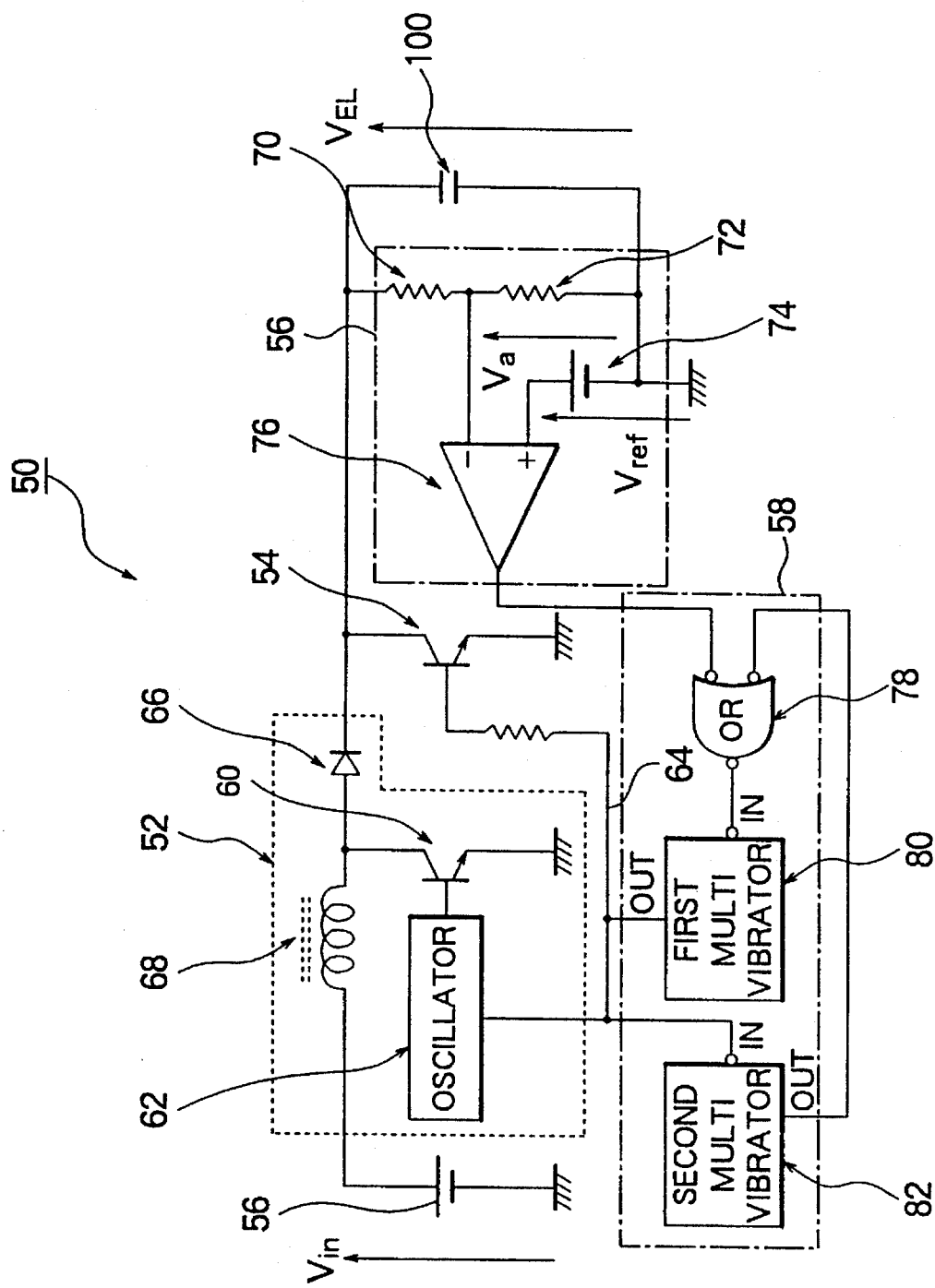
FIG. 3 is a schematic diagram of a powder type EL device according to an embodiment of the present invention.

Referring to FIG. 3, there is shown a schematic diagram of an EL device according to an embodiment of the present invention. The EL device comprises a capacitive EL element 100 and a drive circuit 50 including a step-up circuit 52, discharge transistor 54, a comparator section 56, and a control section 58.

In the step-up circuit 52, the positive terminal of battery 56 is connected to the first terminal of reactor 68, the second terminal of which is connected to the collector of first transistor 60 having an emitter connected to the ground. The base of first transistor 60 is connected to the output of oscillator 62, the input of which is connected to the output line 64 of the control section 58. The second terminal of reactor 68 is also connected through the diode 66 to the EL element 100 as the output of the step-up circuit 52.

The output of the step-up circuit 52 is connected to the first electrode of the EL element 100, the second terminal of which is connected to the ground. The output of the step-up circuit 52 is also connected to the collector of discharge transistor 54, the base of which is connected to the output line 64 of the control section 58 and the emitter of which is connected to the ground. The output of the step-up circuit 52 is further connected to the input of the comparator section 56 including serial resistors 70 and 72 acting as a voltage divider, reference voltage generator 74 and comparator 76. The output of the comparator 76 is connected to the input of the control section 58. The control section 58 comprises OR gate 78, first mono-stable multivibrator 80 and second mono-stable multivibrator 82.

In operation, the step-up circuit 52 boosts the output voltage of batter 56 to generate a periodical surge-pulse train having a relatively short pulse duration. The output of the step-up circuit 52 is supplied to the EL element 100 through diode 66 to charge the EL element 100 thereby raising the voltage $V_{EL}$ of the EL element 100 and effecting luminescence of the EL element 100. The voltage Va dividing the voltage $V_{EL}$ of the EL element 100 by serial resistors 70 and 72 is compared with the reference voltage Vref in the comparator 76. When the voltage $V_{EL}$ comes to a saturation level, Va>Vref holds so that the output of comparator 76 is turned from an H-state to an L-state and supplied through OR gate 78 of the control section 58 to first multivibrator 80. First mono-stable multivibrator 80 is triggered by the falling edge of comparator 76 so that the output line 64 of the control section 58 rises to an H-state and remains in the H-state during the time period Tdis.

The H-state of the output line 64 of the control section 58 stops the operation of oscillator 62 during time period Tdis, thereby stopping the charge current flowing towards the EL element 100. The H-state of the output line 64 of the control section 58 also turns on discharge transistor 54, thereby effecting discharge of the EL element 100 for the time period Tdis. When the output of first mono-stable multivibrator 80 falls to an L-state again, discharge transistor 54 is turned off while oscillator 62 is triggered to oscillate again thereby effecting the charge-up of the EL element 100 by the step-up circuit 52. In this manner, the EL element 100 is charged and discharged periodically to generate a saw tooth voltage $V_{EL}$ on the first electrode, with the peak voltage thereof being $V_{ELMAX}$ and the minimum voltage thereof being the ground level.

Second mono-stable multivibrator 82 is triggered by the falling edge of the output of first mono-stable multivibrator 80 to remain in an H-state during a certain time period Tc. The time period Tc is set to be longer than the charging period of the drive circuit 52 in a normal condition of the EL element 100. Accordingly, second mono-stable multivibrator 82 in an H-state is triggered again and again by subsequent falling edges of first mono-stable multivibrator 80 in the normal condition of the EL element, so that second multivibrator 82 remains in an H-state as long as a normal condition continues.

Second multivibrator 82 is provided for a back-up of comparator 76 in a case where first multivibrator 80 is not triggered by comparator 76 because of an increase of loss in the EL element 100. If the loss of the EL element 100 is increased by a certain amount due to deterioration of the EL element 100 caused by an enviromental variation such as increase of temperature or relative humidity, the voltage $V_{EL}$ of the EL element 100 does not rise up to predetermined maximum value $V_{ELMAX}$ so that the output of the comparator 76 remains in an H-state for a long period of time without second multivibrator 82. The output of second mono-stable multivibrator 82, however, falls to an L-state in this case at an end of time period Tc starting at the start of a charge period, hence, OR gate 78 receiving the output of second multivibrator 82 triggers first multivibrator 80 to control discharge transistor 54 and the step-up circuit 52. Second multivibrator 82 functions for a periodical operation of the drive circuit 52 defined by the period Tc in this case. Accordingly, the EL element 100 can be luminous even when the loss of the EL element 100 is increased due to an enviromental condition.

In FIG. 3, there should be a relationship among the voltage Vin of battery, the forward voltage drop $V_F$ of diode 66 and emitter-collector saturation voltage Vsat of discharge transistor 54 such that:

$$Vin < (V_F + Vsat).$$

If, on the contrary, $Vin > (V_F + Vsat)$ should holds, invalid current which does not contribute to the luminescence of the EL element 100 flows from battery 56 through reactor 68, diode 66 and discharge transistor 54 to the ground, thereby reducing the efficiency of the drive circuit 50.

Figure 4A:
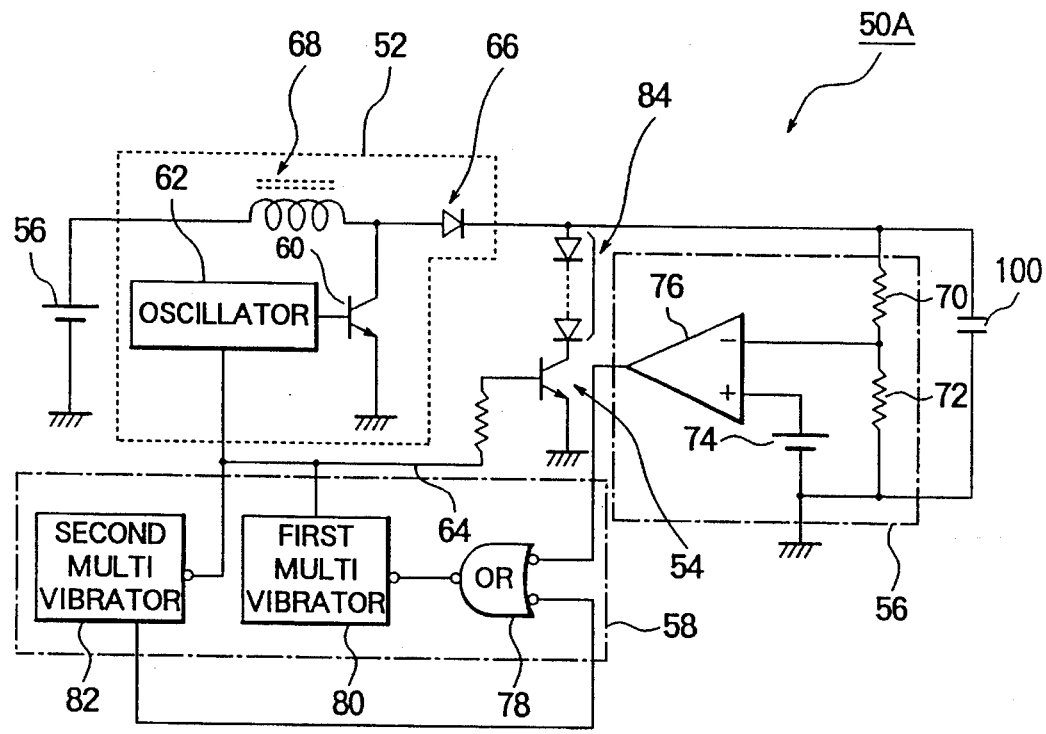
FIGS. 4A and 4B are schematic diagrams of an improved variation of the EL device of FIG. 3.
Figure 4B:
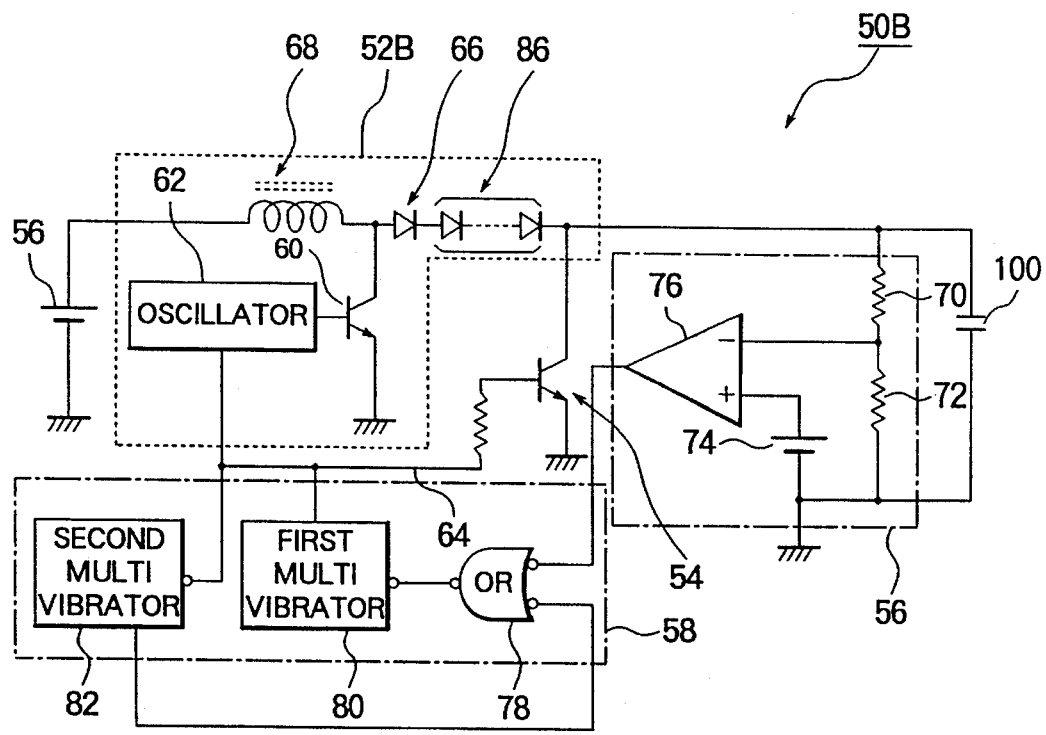
Figure 5:
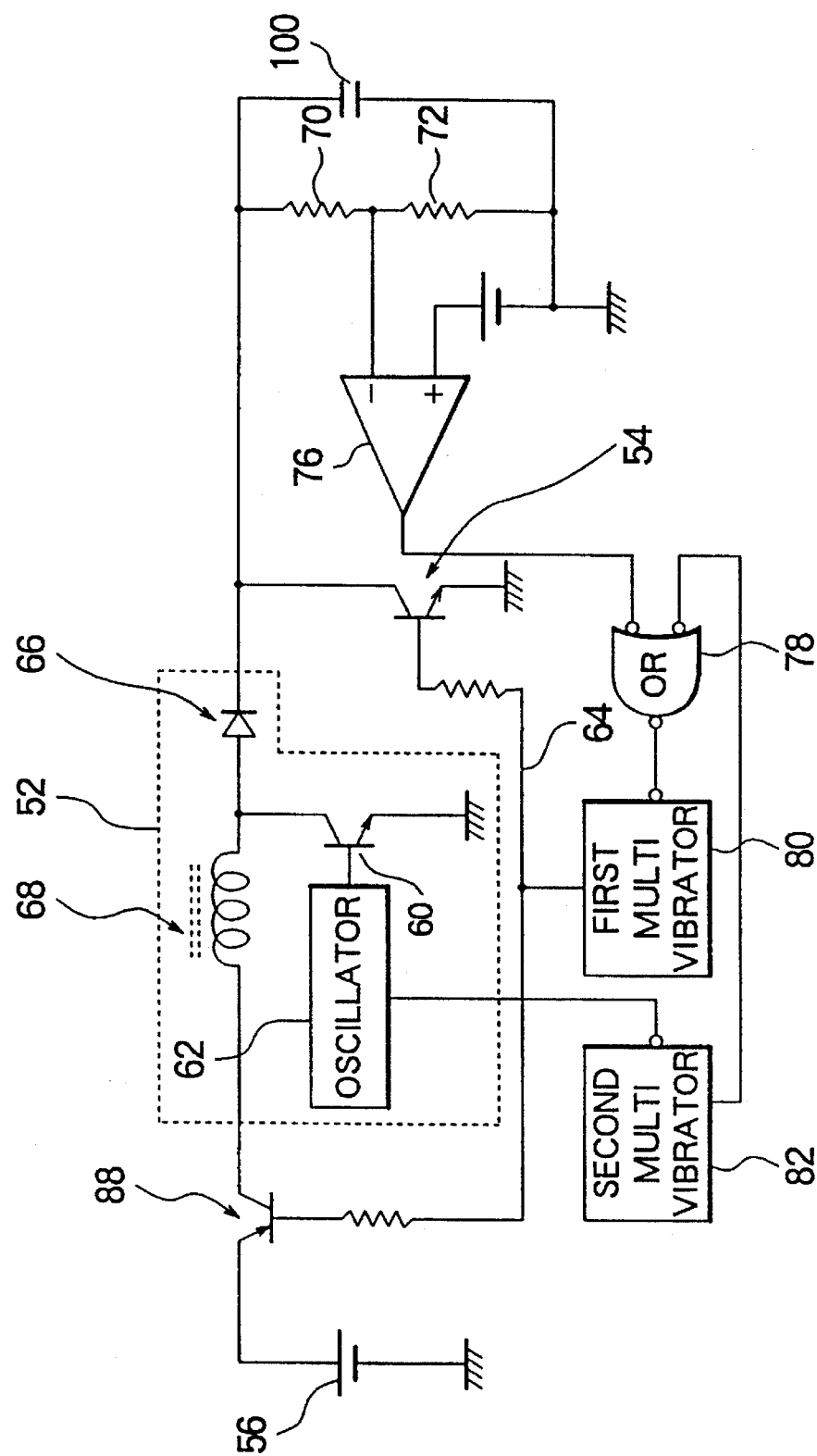
FIG. 5 is a schematic diagram of a powder type EL device according to a second embodiment of the present invention.

FIGS. 4A, 4B and FIG. 5 show variations of the embodiment of FIG. 3 for improvement of avoiding the invalid current as described above. In FIG. 4A, a set of serial n diodes 84 each having the forward voltage drop $V_F$ is disposed between the output of the step-up circuit 52 and the emitter of discharge transistor 54. In this variation, $$Vin < \{V_F \cdot (n+1) + Vsat\}$$

holds, so that the invalid current is reduced to substantially zero.

In FIG. 4B, a set of serial n diodes 86 having a function similar to that as described above are disposed following diode 66 at the output of the step-up circuit 52 for suppressing invalid current flowing to discharge transistor 54. Similar effect can be obtained in this variation to that of the variation of FIG. 4A. The other construction in FIGS. 4A or 4B is similar to that in FIG. 3. In FIG. 5, third switching transistor 88 is inserted between the positive terminal of battery 56 and the input of the step-up circuit 52 so that third switching transistor 88 is turned off during the discharge period.

In FIGS. 3, 4A, 4B and 5, each of the switching transistors is shown as n-p-n bipolar transistor. The switching transistors, however, may be any other switching devices, such as FETs.

Figure 6A:
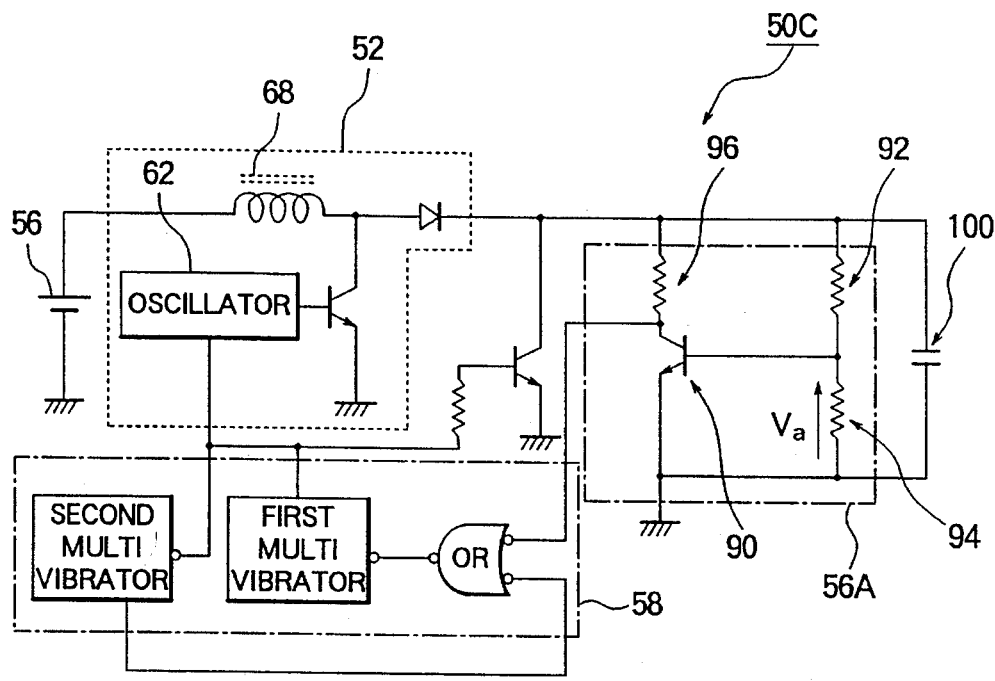
FIGS. 6A and 6B are schematic diagrams of a powder type EL device according to a second embodiment of the present invention and a variation thereof, respectively.

FIG. 6A shows an EL device according to a second embodiment of the present invention. In FIG. 6A, the comparator section 56A is composed of third transistor 90 and serial resistors (voltage divider) 92 and 94 dividing the voltage $V_{EL}$ of the EL element 100. In this embodiment, the collector of third transistor 90 is connected to the positive terminal of battery 56 through resistor 96. In operation, when the voltage Va rises up to the base-emitter forward voltage drop (approximately, 0.6 V) of third transistor 90, third transistor 90 is turned on so that the similar function can be obtained as in the case of comparator section 56 in FIG. 3.

Figure 6B:
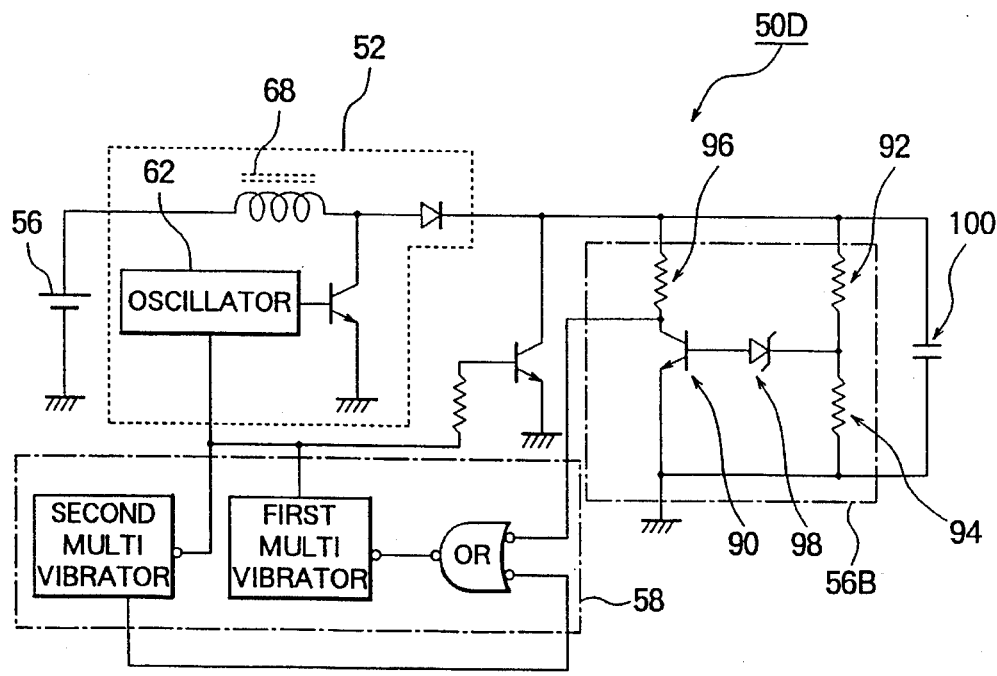

FIG. 6B is a variation of the embodiment of FIG. 6A. In FIG. 6B, Zener diode 98 is inserted between the base of third transistor 90 and the voltage divider 92 and 94. In this variation, the ratio of the voltage divider 92 and 94 can be selected depending on the break-down voltage of Zener diode 98. The other construction is similar to that of FIG. 6A.

Although the present invention is described with reference to the preferred embodiments, the present invention is not limited to such embodiments and it will be obvious for those skilled in the art that various modifications or alterations can be easily made based on the above embodiments within the scope of the present invention.

What is claimed is:

1. A powder type electroluminescent device comprising a capacitive electroluminescent element, a step-up circuit including a rectifying element, for converting a DC source voltage into a surge-pulse train, said step-up circuit providing said surge-pulse train to said capacitive electroluminescent element during a charge period to thereby charge said capacitive electroluminescent element, a voltage detector for detecting a predetermined positive voltage of said capacitive electroluminescent element during said charge period to thereby generate a charge-up signal, said predetermined positive voltage being lower than a breakdown voltage of said capacitive electroluminescent element, a discharge section for discharging electric charge from said capacitive electroluminescent element during a discharge period occurring alternately with said charge period, and a control section for starting said discharge period in response to said charge-up signal, wherein said control section comprises a monostable multivibrator triggered by said charge-up signal, and wherein in case that the voltage of said capacitive electroluminescent element does not reach said predetermined positive voltage during said charge period, said control section will allow said capacitive electroluminescent element to continue to be luminous.

2. A powder type electroluminescent device comprising a capacitive electroluminescent element, a step-up circuit including a rectifying element, for converting a DC source voltage into a surge-pulse train, said step-up circuit providing said surge-pulse train to said capacitive electroluminescent element during a charge period to thereby charge said capacitive electroluminescent element, a voltage detector for detecting a predetermined positive voltage of said capacitive electroluminescent element during said charge period to thereby generate a charge-up signal, said predetermined positive voltage being lower than a breakdown voltage of said capacitive electroluminescent element, a discharge section for discharging electric charge from said capacitive electroluminescent element during a discharge period occurring alternately with said charge period, and a control section for starting said discharge period in response to said charge-up signal, wherein said control section includes a first and a second monostable multivibrator so as to start said discharge period further responsive to elapse of a predetermined time period from generation of said charge-up signal.

3. A powder type electroluminescent device as defined in claim 2 wherein said first mono-stable multivibrator defines said charge period, said second mono-stable multivibrator having functional means for finishing said charge period when said charge-up signal is not generated within a predetermined period of time.

4. A powder type electroluminescent device as defined in claim 1 wherein said discharge section includes a plurality of serially connected diodes and a switching transistor connected to said plurality of diodes in series, a total sum of forward voltage drops of said serially connected diodes and a voltage drop of said switching transistor during an ON state of said switching transistor and a forward voltage drop of said rectifying element being set at a value larger than said DC source voltage for reducing invalid current flowing through said discharge section.

5. A powder type electroluminescent device as defined in claim 1 wherein said discharge section has a switching transistor, said step-up circuit further including a plurality of serially connected diodes connected in series to said rectifying element, a total sum of forward voltage drops of said serially connected diodes and a forward voltage drop of said rectifying element and a voltage drop of said switching transistor during an ON state of said switching transistor being set at a value larger than said DC source voltage for reducing invalid current flowing through said discharge section.

6. A powder type electroluminescent device as defined in claim 1 further comprising a switching means connected to the input of said step-up circuit.

* * * * *